UNITED STATES PATENT OFFICE.

ARTHUR ASHWORTH AND JOSHUA BÜRGER, OF MANCHESTER, ENGLAND.

NITROSONAPHTHOL DYE AND PROCESS OF MAKING SAME.

SPECIFICATION forming part of Letters Patent No. 548,346, dated October 22, 1895.

Application filed August 2, 1894. Serial No. 519,268. (Specimens.) Patented in England June 12, 1893, No. 11,556.

*To all whom it may concern:*

Be it known that we, ARTHUR ASHWORTH and JOSHUA BÜRGER, of Manchester, England, have invented a new and useful Method for the Production of new Coloring-Matters Suitable for Dyeing and Printing, (for which a patent has been received in England, No. 11,556, dated June 12, 1893,) of which the following is a specification.

It has been known some time that by the energetic action of sulphurous acid and its salts on nitrosobetanaphthol an amidonaphtholsulfonic acid was produced. We have, however, discovered that by the moderate action of bisulfites another product is obtained which is of great technical value. To prepare this product, we proceed in the following manner: One part, by weight, of nitrosobetanaphthol, by preference in form of a finely-divided paste, is mixed with two parts, by weight, of a solution of bisulfite of soda of about 60° Twaddle, and the mixture is gently heated on the water-bath to about 25° to 30° centigrade, being continuously stirred. When the nitrosobetanaphthol begins to dissolve, the external heating is discontinued and there is a rise in temperature of about 20° centigrade. After some time the whole mass solidifies, forming a paste of silver-gray crystals, which are our new product. The crystals are filtered, pressed, and preferably used as a paste.

In this invention we do not limit ourselves to the use of bisulfite of soda; but other bisulfites acting in the same manner can be used.

Our new compound is easily soluble in water, forming a colorless solution, which, however, after standing for some time grows darker.

Addition of caustic soda decomposes the aqueous solution, producing a green precipitate of the sodium salt of nitrosobetanaphthol.

The new product is very valuable for dyeing and printing purposes, producing with iron mordants valuable green and with chrome mordants brown shades.

The new product of combination between alpha-nitrosobetanaphthol and sodium bisulfite combines with diazo compounds, producing coloring-matters (dyeing and printing) with mordants, which, however, we do not claim herein, as they form the subject of application, Serial No. 514,096, filed June 9, 1894.

What we claim as new is—

1. The method of producing a new compound which consists in treating nitrosobeta- 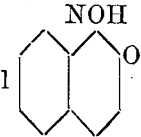 naphthol with bisulfites at a temperature of about 40° to 50° centigrade, substantially as heretofore set forth.

2. The new dye consisting of grayish to white crystals being easily soluble in water which solution is at first colorless growing darker on standing, is decomposed on addition of caustic alkalies producing green shades with iron mordants and brown shades with chrome mordants and having the properties substantially as heretofore set forth.

ARTHUR ASHWORTH.
JOSHUA BÜRGER.

Witnesses:
ARTHUR C. HALL,
JOHN W. THOMAS.